| [19] | [11] | 4,045,400 |
| --- | --- | --- |

Korshak et al.　　　　　　　　　　　　　　　　　　　　　　[45]　Aug. 30, 1977

[54] ANTIFRICTION SELF-LUBRICATING MATERIAL

[76] Inventors: Vasily Vladimirovich Korshak, ulitsa Gubkina, 4, kv. 81; Irina Alexandrovna Gribova, ulitsa Vavilova, 12, kv. 31; Martin Izrailevich Kabachnik, ulitsa Gubkina, 4, kv. 11; Alexandr Petrovich Krasnov, prospekt Kalinina, 31, kv. 28; Alla Nikolaevna Chumaevskaya, ulitsa Novatorov, 40, kv. 24; Olga Vladimirovna Vinogradova, 5 Parkovaya ulitsa, 56, korpus 6, kv. 35; Svetlana Vasilievna Vinogradova, ulitsa Miklukho-Maklaya, 30, korpus 2, kv. 63; Evgenia Semenovna Krongauz, Leningradsky prospekt, 26, kv. 60; Alla Markovna Berlin, ulitsa Obrucheva, 3, korpus 4, kv. 67, all of Moscow; Alexandr Vasilievich Vinogradov, prospekt RKKA, 180, kv. 56, Zagorsk Moskovskoi oblasti; Galina Ilinichna Gureeva, ulitsa Molostovykh, 11, korpus 5, kv. 18, Moscow; Leonid Sergeevich Zakharov, B.Bronnaya ulitsa, 20, kv. 17, Moscow; Vladimir Dmitrievich Vorobiev, Novocheremushkinskaya ulitsa, 43/30, kv. 152, Moscow; Irina Sergeevna Mazaeva, Beskudnikovsky bulvar, 2, korpus 2, kv. 73, Moscow; Georgy Viktorovich Mamatsashvili, Ierusalimskaya ulitsa, 6, kv. 119, Moscow; Nikolai Sergeevich Zabelnikov, Zheleznodorozhnaya ulitsa, 26a, kv. 102, Krasnogorsk Moskovskoi oblasti; Natalia Monovna Kofman, Sevastopolsky prospekt, 31, korpus 2, kv. 45, Moscow, all of U.S.S.R.

[21] Appl. No.: 577,792

[22] Filed: May 14, 1975

[51] Int. Cl.$^2$ .................... C08K 3/30; C08K 9/02
[52] U.S. Cl. .................................. 260/37 N
[58] Field of Search .......................... 260/37 N

[56] References Cited

U.S. PATENT DOCUMENTS

| 3,344,107 | 9/1967 | Miller | 260/37 N |
| --- | --- | --- | --- |
| 3,505,295 | 4/1970 | Grunsteidl et al. | 260/37 N |
| 3,852,244 | 12/1974 | Heath et al. | 260/37 N |

*Primary Examiner*—Sandra M. Person

[57] ABSTRACT

An antifriction self-lubricating material comprising fusible polyimides or polyphenylquinoxalines taken in a quantity of from 5 to 95 percent by weight of the antifriction material, and a filler of molybdenum disulphide modified with phosphorus-containing acids or phosphorus-containing esters, the phosphorus content in the modified molybdenum disulphide being within the range from 0.01 to 2 percent by weight, and the modified molybdenum disulphide being taken in a quantity of from 5 to 95 percent by weight of the antifriction material.

The modified molybdenum disulphide employed as the filler imparts improved antifriction properties to the material.

8 Claims, No Drawings

ANTIFRICTION SELF-LUBRICATING MATERIAL

The present invention relates to antifriction self-lubricating materials which are actually plastics.

Antifriction self-lubricating plastics combining the properties of solid lubricants and structural materials are employed for manufacturing retainer rings, bearing linings, various components of gear trains utilized in dry-friction assemblies, and the like.

Antifriction self-lubricating plastics provide for a low coefficient of friction in the absence of conventional liquid lubricant or lubricating greases.

The antifriction properties inherent in antifriction self-lubricating materials derive from the fact that the entire friction component is a monolithic lubricating mass.

Materials of this kind go into arrangements where liquid lubricants cannot or must not be used, such as electric vacuum units, movie projectors, components of radiation equipment, bearings designed for use at high temperatures and under outer space conditions, and the like.

The antifriction self-lubricating plastics are multicomponent systems bound together by polymers exhibiting all the requisite properties, above all, heat resistance and thermal endurance, radiation resistance, resistance to aggressive chemicals and processability.

Antifriction plastics employ widely known solid lubricants, such as graphite, molygdenum disulphide and the like, as the fillers. With a view to improving the strength of the material, the filler may incorporate fibrous components, such as asbestos, glass fiber or asbestos cloth. The filler may likewise incorporate metallic powders, such as powdered molybdenum, copper, nickel and other metals, which serve to improve the thermal and electrical conductivity, moldability and strength of the antifriction material.

Said fillers are incorporated in the antifriction material either separately or in combination with one another.

The content of the filler in the antifriction material may vary over a rather broad range; its optimal content is selected in each particular case depending on the requirements the product manufactured from this material is to meet.

It is known in the art to employ anitfriction materials in the form of plastics on the basis of polyimides and a solid lubricant filler, such as graphite, molybdenum disulphide, etc. It is likewise known in the art to employ antifriction materials wherein polyamides combined with polyarylates and aromatic polyamides constitute the binder.

The rigid-chain polyarylates or aromatic polyamides introduced into the polyamide-base antifriction material add stability to the friction properties thereof.

It is recommended to emply an antifriction material comprising from 4 to 78 percent by weight of polyamide, 2 to 95 percent by weight of fillers and from 1 to 20 percent by weight of polyarylates or aromatic polyamides.

One of the chief disadvantages inherent in said antifriction materials consists in their inadequate thermal resistance. A temperature rise from 100° to 140° C. causes a rise in the coefficient of friction from 0.08 to 0.15. As the temperature rises to 250° C., the properties of the antifriction materials progressively deteriorate, resulting in a loss of weight of the product, reduced preformance and, ultimately, total destruction.

If such materials are to be employed in dry-friction assemblies, particularly in sliding bearings, their wear resistance must be improved.

It is an object of the present invention to provide antifriction self-lubricating materials featuring improved wear resistance combined with adequate mechanical properties unimpaired by high temperatures.

The foregoing object is attained by the provision of an antifriction self-lubricating material based on a nitrogen-containing polymer and incorporating fillers, wherein, in accordance with the invention, the nitrogen-containing polymer may be fusible polyimides or polyphenylquinoxalines taken in a quantity of from 5 to 95 percent by weight of the antifriction material, and the filler may be molybdenum disulphide modified with phosphorus-containing acids or phosphorus-containing esters, the content of phosphorus in the modified molybdenum disulphide being from 0.01 to 2 percent by weight and the content of the modified molybdenum disulphide being from 5 to 95 percent by weight of the antifriction material, or a mixture of molybedenum disulphide with said modified molybdenum disulphide, the molybdenum disulphide content being from 1 to 90 percent by weight of the antifriction self-lubricating material.

To produce antifriction self-lubricating materials featuring improved wear resistance, the nitrogen-containing polymer must be, in accordance with the invention, a fusible polyimide of the general formula

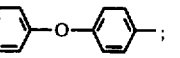

where R = 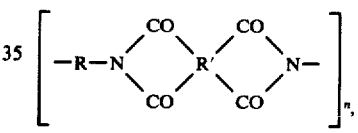

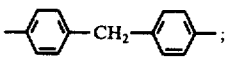

$n = 20$ to $400$;

R' = 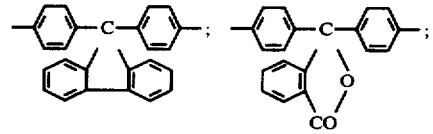

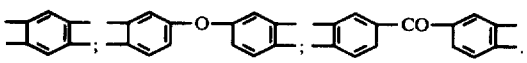

$n = 20$ to $400$.

To produce antifriction self-lubricating materials exhibiting improved wear resistance at temperatures on the order of 300° C., the nitrogen-containing polymer must be, in accordance with the invention, a polyphenylequinoxaline of the following chemical structure:

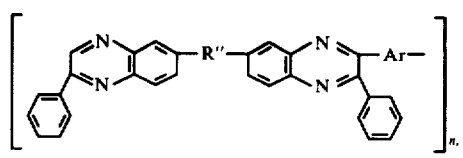

where

R" = —O—; —SO$_2$—; —CO—; or is absent;

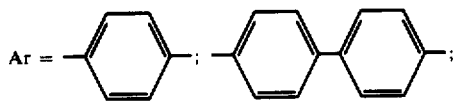

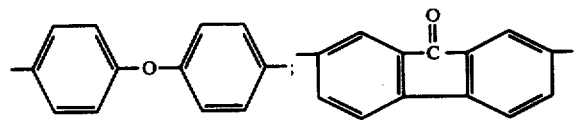

n = 50 to 300.

The phorphorus-containing acids for modifying molybdenum disulphide, in accordance with the invention, are ortho- and metaphosphoric acids, phosphonic acids of the general formula

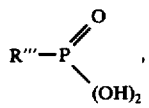

or phosphonic acids of the general formula

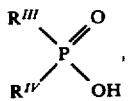

where R$^{III}$ and R$^{IV}$ being are alkyl, cycloalkyl or aryl from C$_1$ and C$_{16}$, R$^{III}$ and R$_t^{IV}$ being either identical or differing one from the other.

The phosphorus-containing ester for modifying molybdenum disulphide, in accordance with the invention, may be phenyl(1,1'-dihyroperfluoralkyl)phosphates of the general formula

where $x = 1-3$ and $y = 0-3$, or phenyl(1,1'-dihydroperfluoralkoxy)cyclotriphosphazenes of the general formuls

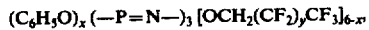

where $x = 0-6$ and $y = 0-3$. Besides said esters, use can also be made of phosphinic acid esters of the general formula

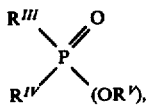

or phosphonic acid esters of the general formula

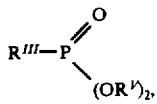

where R$^V$ is the same as R$^{III}$ or R$_{IV}$.

The molybdenum disulphide modification is effected by directly incorporating the phosphorus-containing acids or phosphorus-containing esters of various chemical structures described hereabove into the starting molybdenum disulphide in the course of mixing.

Having been modified with said phosphorus-containing reagents, the molybdenum disulphide contains, in accorrance with the invention, from 0.01 to 2 percent by weight of phosphorus. The phosphorus content in the molybdenum disulphide is controlled by varying the quantity of the phosphorus-containing compound used for modification.

In accordance with the invention, the modified molybdenum disulphide preferably contains from 0.05 to 0.1 percent by weight of the phosphorus.

In accordance with the invention, the proposed antifriction material preferably contains from 10 to 80 percent by weight of modified molybdenum disulphide.

In order to improve the thermal and electrical conductivity of the proposed antifriction material, as well as to improve its moldability and raise its strength, said antifriction material, in accordance with the invention, preferably incorporates a dopant, viz. metal powders of silver, copper, molybdenum or nickel, taken together or separately, in the quantity from 1 to 41 percent by weight of the antifriction material.

According to an alternative embodiment of the invention, the antifriction material has the following composition, in wt.%: fusible polyamide, 10; molybdenum disulphide containing 0.05 percent by weight of phosphorus, 80; highly dispersed carbon, 5; and metallic molybdenum powder, 5.

According to yet another embodiment of the invention, the antifriction material has the following composition, in wt.%: polyphenylquinoxaline, 20; molybdenum disulphide containing 0.1 percent by weight of phosphorus, 43; graphite, 19; asbestos, 3; and silver powder, 15.

The antifriction self-lubricating material according to the invention is distinguished by its high mechanical strength, excellent processability, stable coefficient of friction in a wide range of temperatures, and high wear resistance.

For the sake of brevity, the molybdenum disulphide modified with phosphorus-containing acids or phosphorus-containing esters will be referred to hereinafter as modified molybdenum disulphide.

Thus for instance, an antifriction material produced by pressing at a temperature of 400° C. and a pressure of 1,000 kg/sq.cm. and composed of 90 parts by weight of a polyimide of the formula

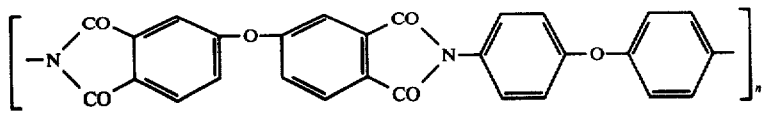

where $n = 400$, and 10 parts by weight of modified molybdenum disulphide containing 0.01 percent by weight of phosphorus, has a higher wear resisance, microhardness and strength than that on the basis of molybdenum disulphide (see Tables I and II).

Table I

| Coefficient of friction and wear resistance of antifriction materials | | | |
|---|---|---|---|
| Material with molybdenum disulphide | | Material with molybdenum disulphide modified with di-n-heptyl-phosphonic acid | |
| Wear at room temp., g Within 1st hour | Coef. of friction Within 3rd hour | Wear at room temp., g Within 1st hour | Coef. of friction Within 3rd hour |
| 0.0037 | 0.09 | 0.0023 | 0.08 |
| 0.0015 | 0.08 | 0.0007 | 0.06 |

Table II

| Mechanical properties of antifriction materials | | |
|---|---|---|
| Type of material | Microhardness kg/sq.mm. | Bending stress kg/sq.mm. |
| With modified molybdenum disulphide | 40.0 | 660 |
| With molybdenum disulphide | 27.0 | 500 |

The microhardness of the materials was determined in a test which comprised imbedding a diamond pyramid in the material under study with a specified force and measuring the linear magnitude of the diagonal of the indentation thus produced. Microhardness is defined as the load (kg) over the side surface area (sq.mm.) of the indentation on the assumption that the angles of the indentation correspond to the angles of the pyramid.

The bending stress as used herein must be construed as the stress arising in the specimen upon its destruction.

The proposed antifriction materials on the basis of polyphenylquinoxalines and modified molybdenum disulphide impart high-temperature endurance to the friction assemblies made therefrom, the modified molybdenum disulphide employed in the material lending it improved wear resistance. Thus, tests run on the retainer rings of antifriction bearings manufactured from the proposed antifriction material based on polyphenylquinoxaline of the formula

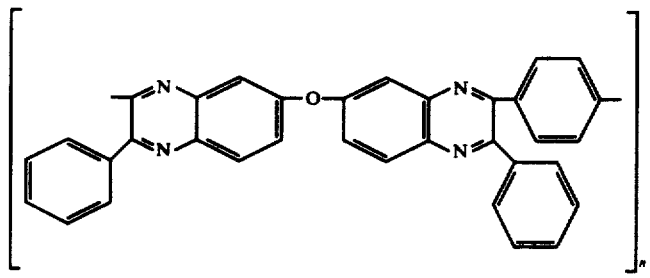

wherein $n = 80$, and indicated that at 300° C. the wear of the material comprising modified molybdenum disulphide amounted to 0.0090 g. for 50 hours, whereas the wear of similar specimens manufactured from a material containing molybdenum disulphide at the same temperature and for the same time was equal to 0.0220 g.

Further merits and advantages of the proposed antifriction self-lubricating materials will become apparent from the detailed description of the invention that follows.

The proposed antifriction self-lubricating material combining the properties of solid lubricants and structural materials, in accordance with the invention, is a multi-component system, wherein the binder is a nitrogen-containing polymer exhibiting all the required properties, above all, heat resistance and thermal endurance, radiation resistance, resistance to aggressive chemicals and processability.

The polyimides and polyphenylquinoxalines employed in the proposed antifriction self-lubricating material meet the general requirements for the polymeric binder in an antifriction material.

To produce the proposed antifriction self-lubricating materials, the nitrogen-containing polymer may be, in accordance with the invention, a fusible polyamide of the general formula $$\left[ -R-N\begin{array}{c}CO\\CO\end{array}R'\begin{array}{c}CO\\CO\end{array}N- \right]_n,$$

where R = 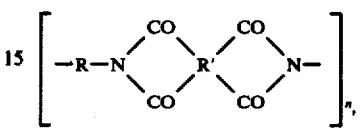

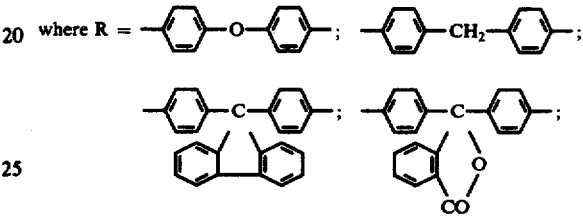

$n$ = 20 to 400;

R' = 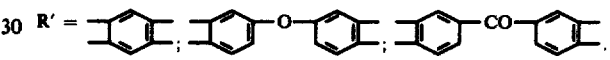

Said polymeric binder amounts to 5 to 95 percent by weight of the antifriction material.

In accordance with the invention, use may be made both of soluble polyimides having a degree of polymerization $n$ of from 20 to 400, such as those produced from anilinephthalein and anhydrides of tetracarboxylic acids, and insoluble polyimides, e.g. one on the basis of the dianhydride of 3,3', 4,4'-di-phenyloxidetetracarboxylic acid and diaminodiphenyloxide. The chief requirement of the polyimides employed in the proposed antifriction material is adequate processability.

To produce the proposed antifriction materials, the nitrogen-containing polymer may likewise be, in accordance with the invention, a polyphenylquinoxaline of the following chemical structure

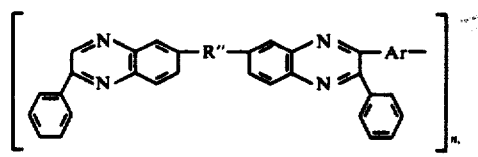

where
R" = —O—; —SO$_2$—; —CO—; or is absent;

Ar = 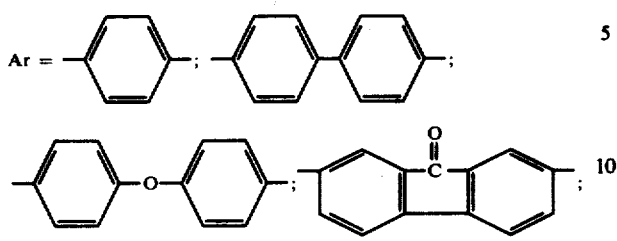

N = 50 to 300,
taken in a quantity of from 5 to 95 percent by weight of the antifriction material.

The polyphenylquinoxalines employed in the proposed antifriction material exhibit high heat resistance and thermal endurance, high resistance to aggressive chemicals and adequate processability. Thus, for instance, polyphenylquinoxaline produced from 3,3′,4,4′-tetraaminodiphenyl ether and 1,4-bis(phenylglyoxalyl) benzene of the formula

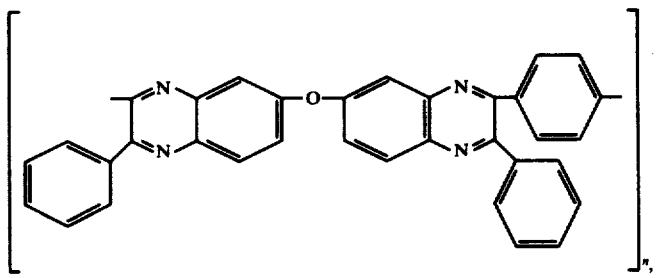

wherein $n$ = 160, having a molecular weight of 80,000 and a reduced viscosity is m-cresol $\eta = 0.83$ $dl/g$ showed a softening point of 280° C. (as derived from the thermomechanical curves). Thermogravimetric testing of this polymer in air at a temperature rise gradient of 4.5 deg./min. showed the thermal destruction point of the polymer to be 480° C.

To achieve improved wear resistance and higher mechanical properties of antifriction self-lubricating plastics on the basis of fusible polyimides and polyphenylquinoxalines, use is made of from 5 to 95 percent by weight of a nitrogen-containing polymer and from 95 to 5 percent by weight of a filler which is composed, in accordance with the invention, of molybdenum disulphide modified with phosphorus-containing acids or esters, said filler containing for from 5 to 95 percent by weight of the antifriction material.

The ratio of the nitrogen-containing polymer of the filler in the proposed antifriction material may vary over a broad range depending on the specific requirements of the product manufactured for the antifriction material. Thus, introduction of a large quantity of fillers in the form of solid lubricants, such as graphite, molybdenum disulphide and the like, reduces the coefficient of friction of the antifriction material. However, reduction of the proportion of the nitrogen-containing polymer e.g. polyimide down to 5 percent by weight results in reduced strength (impact strength of approximately 1 to 1.5 kgcm/sq.cm.), whereas a polyimide content of 95 percent by weight of the antifriction material ensures its high strength (impact viscosity of 25 kgcm/sq.cm).

The phosphorus-containing acids for the modification of molybdenum disulphide, in accordance with the invention, may be ortho- and metaphosphoric acids; phosphonic acids of the general formula

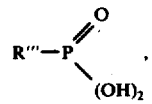

such as methylphosphonic, phenylphosphonic and the like; and phosphinic acids of the general formula

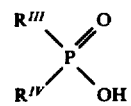

such as di-n-butylphosphinic, di-n-heptylphosphinic, di-n-octylphosphinic, di-n-nonylphosphinic, di-n-undecylphosphinic, methylphenylphosphinic, dicyclohexylphosphinic, diphenylphosphinic, butylphenylphosphinic, ditolylphosphinic, distyrylphosphinic and other acids.

The phosphorus-containing esters employed for the modification of molybdenum disulphide, in accordance with the invention may be phenyl(1,1-dihydroperfluoralkyl)phosphates of the general formula

where $x$ = 1-3 and $y$ = 0-3, such as triphenylphosphate, 1,1′-di-hydroperfluoramyldiphenylphosphate and the like; or phenyl(1,1′-dihydroperfluoralkoxy)cyclotriphosphazenes of the general formula

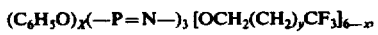

where $x$ = 0-6 and $y$ = 0-3, such as hexa(1,1-dihydroperfluorobutoxy)cyclotriphosphazene, hexaphenoxycyclotriphosphazene, phenoxypenta-(1,1-dihydroperfluorobutoxy)cyclotriphosphazene, and the like.

Along with the modified molybdenum disulphide, the filler may comprise molybdenum disulphide to the extent of from 1 to 90 percent by weight, the modified molybdenum disulphide accounting for from 5 to 95 percent by weight of the antifriction material. Modified molybdenum disulphide may be employed in the antifriction material in combination with molybdenum disulphide with a favorable effect on the economics of production.

The powdered polyimide or polyphenylquinoxaline is throroughly mixed with the filler, molybdenum disulphide modified with phosphorus-containing compounds, as well as with phosphorus-free fillers such as asbestos, graphite, molybdenum disulphide, or highly dispersed carbon.

To produce an antifriction material having improved thermal and electrical conductivity, metallic powders, e.g. powdered Zcopper, silver, molybdenum or nickel, are incorporated in the mixture at the stage of component mixing.

The metallic powders employed in the antifriction material may differ in particle size. Thus, colloidal silver has a particle size of from 0.1 to 1.5 microns, whereas other metallic powders may be of a far larger particle size. The quantity of the metallic powders incorporated in the antifriction material is determined by the specific requirements the material is to meet. Higher contents of the metallic powders in the antifriction material improve its thermal and electrical conductivity, though in some cases impair its antifriction properties.

The components are mixed until a homogeneous mass is formed which is used as a plastic. The resultant plastic in the form of a homogeneous powder is subjected to pressing at a temperature of from 250° to 450° C. and a pressure of from 1,000 to 2,500 kg/sq.cm. to produce items from the antifriction self-lubricating material.

The items thus produced are tested for wear resistance, thermofriction properties and other mechanical characteristics.

Under dry-friction conditions, the molecules of the polymer experience both thermal and mechanical stresses, so that the nitrogen-containing polymeric binder together with the molybdenum disulphide modified with phosphorus-containing acids and phosphorus-containing esters make for a stronger polymerfiller bonding due to the reaction of the molybdenum disulphide and the binder with the phosphorus-containing compounds.

In the wake of heat treatment, the nitrogen-containing polymer, the phosphorus-containing compound (acid or ester) and the molybdenum disulphide filler are strongly bonded, forming a composition exhibiting improved wear resistance.

The present invention will be better understood from the following specific examples illustrating the manufacture of the antifriction material of the invention accompanied by test results.

EXAMPLE 1

Antifriction plastics to be tested were prepared by mixing all the components in a vibratory mill. The plastics thus produced were press molded into specimens in the form of bushings of external diameter 22 mm and bore 12 mm. A control specimen containing molybdenum disulphide was prepared in a similar way. The specimens were tested for frictional behavior in face-to-face friction against steel at a linear velocity of 2 m/sec. and under a load of 2 kg/sq.cm.

The tables present the test results. The plastic had the following composition, parts by weight: 90 polyimide of the formula

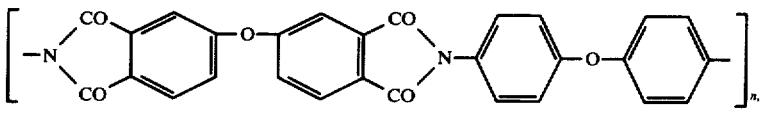

where $n = 400$, 10 molybdenum disulphide of particle size 1 to 2 microns treated with di-n-heptylphosphinic acid and containing 0.01 percent by weight of phosphorus.

The plastic was pressed at a temperature of 400° C. and a specific pressure of 1,000 kg/sq.cm.

Table III

| Antifriction material with molybdenum disulphide | | | Antifriction material with molybdenum disulphide modified with di-n-heptylphosphinic acid | | |
|---|---|---|---|---|---|
| Wear at room temp., g. | | Coef. of friction | Wear at room temp., g. | | Coef. of friction |
| Within 1st hour | Within 3rd hour | | Within 1st hour | Within 3rd hour | |
| 0.0037 | 0.0015 | 0.09 0.08 | 0.0023 | 0.0007 | 0.08 0.06 |

Table IV

| Antifriction material | Microhardness kg/sq.mm. | Bending stress kg/sq.cm. |
|---|---|---|
| modified molybdenum disulphide | 40.0 | 660 |
| With molybdenum disulphide | 27.0 | 500 |

EXAMPLE 2

In this example, the plastic had the following composition, part by weight: 95 polyimide of the formula

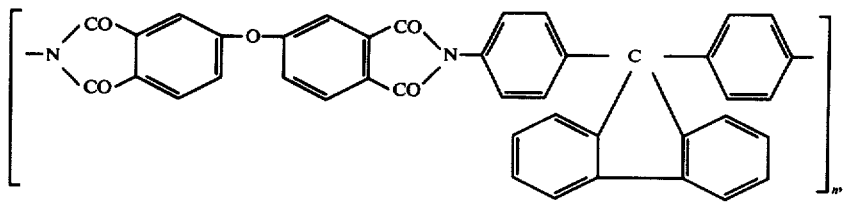

where $n = 400$; 5 molybdenum disulphide of particle size 1 to 2 microns modified with ortho-phosphoric acid and containing 0.05 percent by weight of phosphorus. The plastic was pressed and the resultant specimens tested in procedures duplicating those of Example 1.

Table V

| Antifriction material with molybdenum disulphide | | | Antifriction material with molybdenum disulphide modified with orthophosphoric acid | | |
|---|---|---|---|---|---|
| Wear at room temp., g. | | Coef. of friction | Wear at room temp., g. | | Coef. of friction |
| Within 1st hour | Within 3rd hour | | Within 1st hour | Within 3rd hour | |
| 0.0152 | 0.0105 | 0.12 | 0.0103 | 0.0082 | 0.10 |

EXAMPLE 3

In this example, the plastic had the following composition, parts by weight: 10 polyimide of the formula

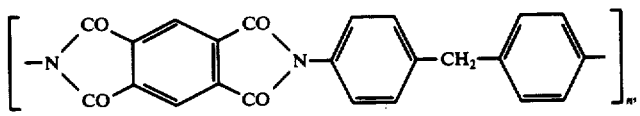

where $n = 100$; 13 molybdenum disulphide of particle size 1 to 2 microns modified with methylphosphonic acid and containing 0.03 percent by weight of phosphorus; 5 graphite; 30 highly dispersed carbon; 1 asbestos; 40 metallic copper powder; and 1 metallic silver powder.

The plastic was pressed and the resultant specimens tested in procedures duplicating those of Example 1.

Table VI

| Antifriction material with molybdenum disulphide | | | molybdenum disulphide modified with methylphosphonic acid | | |
|---|---|---|---|---|---|
| Wear at room temp., g. | | Coef. of friction | Wear at room temp., g. | | Coef. of friction |
| within 1st hour | within 3rd hour | | within 1st hour | within 3rd hour | |
| 0.0180 | 0.0133 | 0.085 | 0.0142 | 0.0090 | 0.076 |

EXAMPLE 4

In this example, the plastic had the following composition, parts by weight: 20 polyimide of the formula

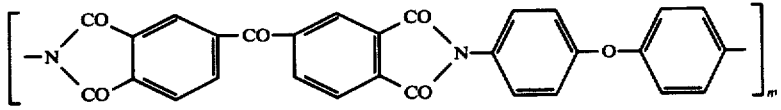

where $n = 100$; 33 molybdenum disulphide of particle size 1 to 2 microns modified with dicyclohexylphosphinic acid and containing 1 percent by weight of phosphorus; 1 highly dispersed carbon; 5 asbestos; 40 metallic molybdenum powder; and 1 metallic copper powder.

The plastic was pressed and the resultant specimens tested in procedures duplicating those of Example 1.

Table VII

| Antifriction material with molybdenum disulphide | | | Antifriction material with molybdenum disulphide modified with dicyclohexylphosphinic acid | | |
|---|---|---|---|---|---|
| Wear at room temp., g. | | Coef. of friction | Wear at room temp., g. | | Coef. of friction |
| within 1st hour | within 3rd hour | | within 1st hour | within 3rd hour | |
| 0.0220 | 0.0130 | 0.13 | 0.0102 | 0.0073 | 0.12 |

EXAMPLE 5

In this example, the plastic had the following composition, parts by weight: 10 polyimide of the formula

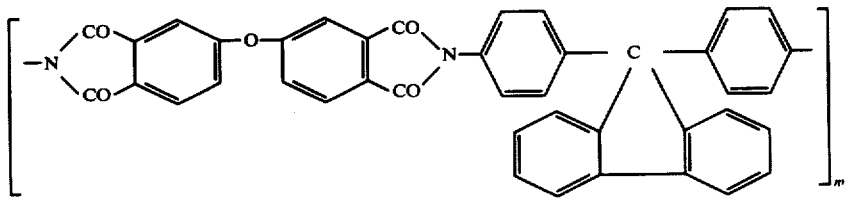

where $n = 400$; 49 molybdenum disulphide of particle size 1 to 2 microns modified with diphenylphosphinic acid and containing 0.07 percent by weight of phosphorus; 1 metallic molybdenum powder; and 40 metallic nickel powder.

The plastic was pressed and the resultant specimens tested in procedures duplicating those of Example 1.

Table VIII

| Antifriction material with molybdenum disulphide | | | Antifriction material with molybdenum disulphide modified with diphenylphosphinic acid | | |
|---|---|---|---|---|---|
| Wear at room temp., g. | | Coef. of friction | Wear at room temp., g. | | Coef. of friction |
| within 1st hour | within 3rd hour | | within 1st hour | within 3rd hour | |
| 0.0079 | 0.0004 | 0.073 | 0.0021 | 0.0003 | 0.062 |

EXAMPLE 6

In this example, the plastic had the following composition, parts by weight: 5 polyimide of the formula

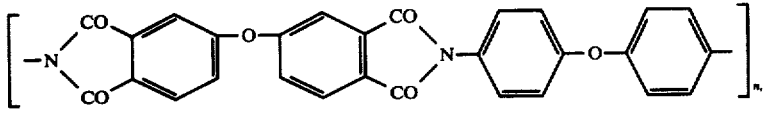

where $n = 100$; 5 molybdenum disulphide of particle size 1 to 2 microns modified with methylphenylphosphinic acid and containing 2 percent by weight of phosphorus; and 90 graphite.

The plastic was pressed and the resultant specimens tested in procedures duplicating those of Example 1.

Table IX

| Antifriction material with molybdenum disulphide | | Coef. of friction | Antifriction material with molybdenum disulphide modified with methylphenylphosphinic acid | | Coef. of friction |
|---|---|---|---|---|---|
| Wear at room temp., g. | | | Wear at room temp., g. | | |
| within 1st hour | within 3rd hour | | within 1st hour | within 3rd hour | |
| 0.0216 | 0.0136 | 0.14 | 0.0164 | 0.0100 | 0.12 |

EXAMPLE 7

In this example, the plastic had the following composition, parts by weight: 15 polyimide of the formula

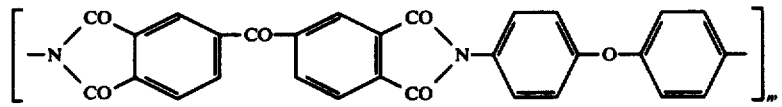

where $n = 100$; 40 molybdenum disulphide of particle size 1 to 2 microns modified with metaphosphoric acid and containing 0.02 percent by weight of phosphorus; 5 highly dispersed carbon; 40 metallic silver powder; and 1 metallic nickel powder.

The plastic was pressed at a temperature of 350° C. and a pressure of 1,000 kg/sq.cm., and the resultant specimens were tested in a procedure duplicating that of Example 1.

Table X

| Antifriction material with molybdenum disulphide | | Coef. of friction | Antifriction material with molybdenum disulphide modified with metaphosphoric acid | | Coef. of friction |
|---|---|---|---|---|---|
| Wear at room temp., g. | | | Wear at room temp., g. | | |
| within 1st hour | within 3rd hour | | within 1st hour | within 3rd hour | |
| 0.0200 | 0.110 | 0.080 | 0.0125 | 0.0075 | 0.076 |

EXAMPLE 8

In this example, the plastic had the following composition, parts by weight: 5 polyimide of the formula

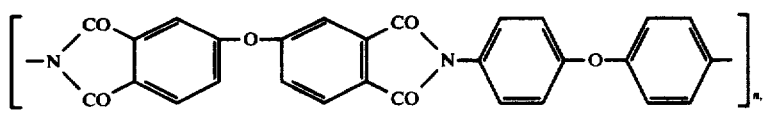

where $n = 100$; and 95 molybdenum disulphide of particle size 1 to 2 microns modified with di-n-butylphosphinic acid and containing 0.01 percent by weight of phosphorus.

The plastic was pressed and the resultant specimens tested in procedures duplicating those of Example 1.

Table XI

| Antifriction material with molybdenum disulphide | | Coef. of friction | Antifriction material with molybdenum disulphide modified with di-n-butylphosphinic acid | | Coef. of friction |
|---|---|---|---|---|---|
| Wear at room temp., g. | | | Wear at room temp., g. | | |
| within 1st hour | within 3rd hour | | within 1st hour | within 3rd hour | |
| 0.0036 | 0.0014 | 0.08 | 0.0022 | 0.0006 | 0.06 |

EXAMPLE 9

In this example, the plastic had the following composition, parts by weight: 10 polyimide of the formula

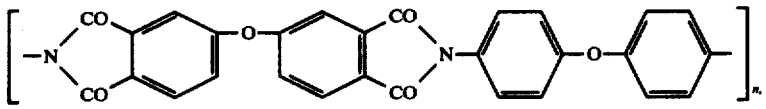

where $n = 100$; 80 molybdenum disulphide of particle size 1 to 2 microns modified with orthophosphoric acid and containing 0.05 percent by weight of phosphorus; 3 highly dispersed carbon; and 5 metallic molybdenum powder.

The plastic was pressed and the resultant specimens tested in procedures duplicating those of Example 1.

Table XII

| Antifriction material with molybdenum disulphide | | Coef. of friction | Antifriction material with molybdenum disulphide modified with orthophosphoric acid | | Coef. of friction |
|---|---|---|---|---|---|
| Wear at room temp., g. | | | Wear at room temp., g. | | |
| within 1st hour | within 3rd hour | | within 1st hour | within 3rd hour | |
| 0.0079 | 0.0005 | 0.072 | 0.0021 | 0.0004 | 0.062 |

EXAMPLE 10

In this example, the plastic had the following composition, parts by weight: 10 polyimide of the formula

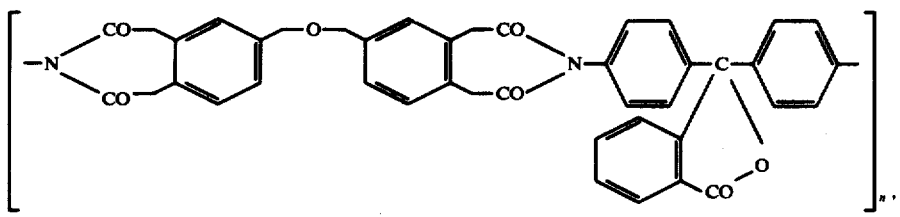

where n = 20; 30 molybdenum disulphide of particle size 1 to 2 microns treated with triphenylphosphate and containing 0.05 percent by weight of phosphorus; 20 molybdenum disulphide; 35 graphite; and 5 metallic molybdenum powder.

The plastic was pressed and the resultant specimens tested in procedures duplicating those of Example 1.

fluorobutoxy)cyclotriphosphazene and containing 0.1 percent by weight of phosphorus; 3 asbestos; 19 graphite; and 15 metallic silver powder.

The plastic was pressed at a temperature of 400° C. and a pressure of 1,000 kg/sq.cm. into sliding bearing retainer rings which were bench-tested at temperatures of 300 and 350° C. at 18,000 rpm and an axial load of 1

Table XIII

| Antifriction material with molybdenum disulphide | | | Antifriction material with molybdenum disulphide modified with triphenylphosphate | | |
|---|---|---|---|---|---|
| Wear at room temp., g. | | Coef. of friction | Wear at room temp., g. | | Coef. of friction |
| within 1st hour | within 3rd hour | | within 1st hour | within 3rd hour | |
| 0.0071 | 0.0005 | 0.057 | 0.0018 | 0.0004 | 0.055 | kg, the duration of the test period being 50 hours.

Table XIV

| | | Test results | | | |
|---|---|---|---|---|---|
| Antifriction material | Type of product | Test temp., °C | Wear in 50 hr, g. | Test temp., °C | Wear in 50 hr., g. |
| Containing molybdenum disulphide modified with hexa(1,1-dihydroperfluorobutoxy)cyclotriphosphazene | Ball bear retainer ring | 300 | 0.0090 | 350 | 0.0103 |
| Containing molybdenum disulphide | " | 300 | 0.0220 | | |

EXAMPLE 11

In this example, the plastic had the following composition, parts by weight: 20 polyphenylquinoxaline of the formula

EXAMPLE 12

In this example, the plastic had the following composition, parts by weight: 95 polyphenylquinoxaline of the

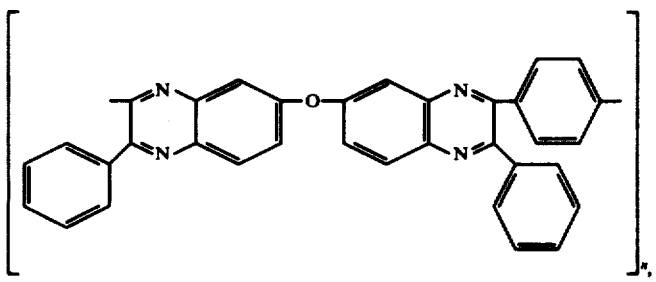

where n = 120; 43 molybdenum disulphide of particle size 1 to 2 microns modified with hexa(1,1-dihydroperformula

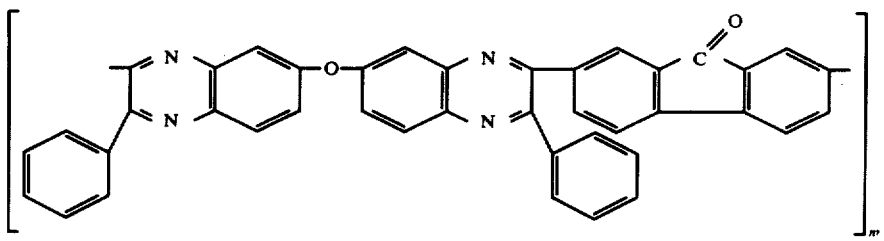

where n = 160; 5 molybdenum disulphide of particle size 1 to 2 microns modified with dicyclohexylphosphinic acid and containing 0.1 percent by weight of phosphorus.

The plastic was pressed and the resultant specimens tested in procedures duplicating those of Example 1.

rus; 5 graphite; 30 highly dispersed carbon; 1 asbestos; 40 metallic copper powder; and 1 metallic silver powder.

The plastic was pressed and the resultant specimens tested in procedures duplicating those of Example 1.

Table XVI

| Antifriction material with molybdenum disulphide | | | | Antifriction material with molybdenum disulphide modified with methylphosphonic acid | | | |
|---|---|---|---|---|---|---|---|
| Wear at 300° C., g. | | | Coef. of friction | Wear at 300° C., g. | | | Coef. of friction |
| 1st hour | 2nd hour | 3rd hr | | 1st hr | 2nd hr | 3rd hr | |
| 0.1028 | 0.1132 | 0.1542 | 0.12 | 0.0768 | 0.1025 | 0.0923 | 0.10 | tested in procedures duplicating those of Example 1.

Table XV

| Antifriction material with molybdenum disulphide | | | | Antifriction material with molybdenum disulphide modified with dicyclohexylphosphinic acid | | | |
|---|---|---|---|---|---|---|---|
| Wear at 300° C., g. | | | Coef. of friction | Wear at 300° C., g. | | | Coef. of friction |
| 1st hr | 2nd hr | 3rd hr | | 1st hr | 2nd hr | 3rd hr | |
| 0.0675 | 0.0709 | 0.0679 | 0.16 | 0.0582 | 0.0603 | 0.0538 | 0.15 |

EXAMPLE 13

In this example, the plastic had the following composition, parts by weight: 10 polyphenylquinoxaline of the formula

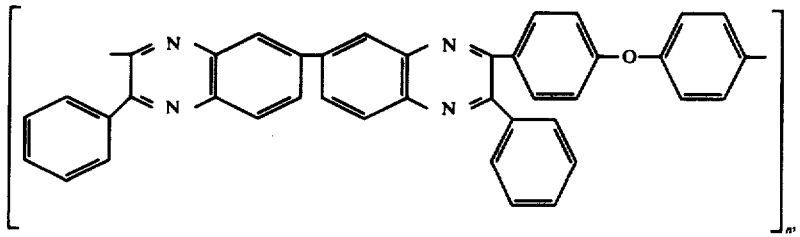

where n = 180; 13 molybdenum disulphide of particle size 1 to 2 microns modified with methylphosphonic acid and containing 0.05 percent by weight of phospho-

EXAMPLE 14

In this example, the plastic had the following composition, parts by weight: 20 polyphenylquinoxaline of the formula

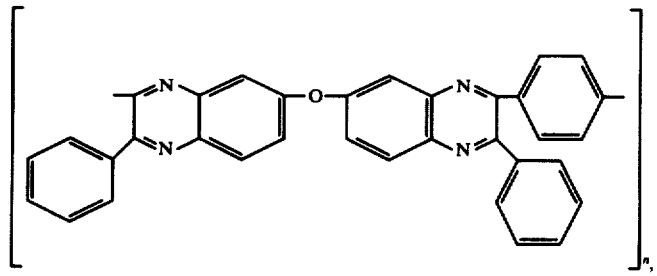

where n = 200; 33 molybdenum disulphide of particle size 1 to 2 microns modified with orthophosphoric acid and containing 0.02 percent by weight of phosphorus; 1 highly dispersed carbon; 5 asbestos; 40 metallic molybdenum powder; and 1 metallic copper powder.

The plastic was pressed and the resultant specimens tested in procedures duplicating those of Example 1.

Table XVII

| Antifriction material with molybdenum disulphide | | | | Antifriction material with molybdenum disulphide modified with orthophosphoric acid | | | |
|---|---|---|---|---|---|---|---|
| Wear at 300° C., g. | | | Coef. of friction | Wear at 300° C., g. | | | Coef. of friction |
| 1st hr | 2nd hr | 3rd hr | | 1st hr | 2nd hr | 3rd hr | |
| 0.0644 | 0.0542 | 0.0899 | 0.13 | 0.0585 | 0.0433 | 0.0584 | 0.12 |

EXAMPLE 15

In this example, the plastic had the following composition, parts by weight: 10 polyphenylquinoxaline of the formula

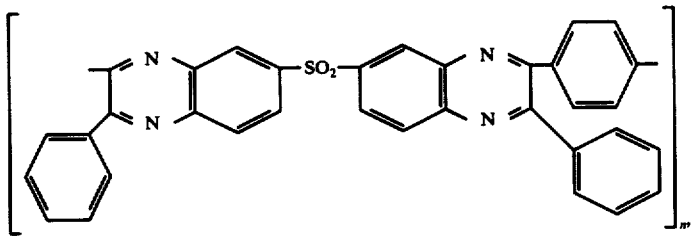

where $n = 50$; 49 molybdenum disulphide of particle size 1 to 2 microns modified with diphenylphosphinic acid and containing 0.07 percent by weight of phosphorus; 1 metallic molybdenum powder; and 40 metallic nickel powder.

The plastic was pressed and the resultant specimens tested in procedures duplicating those of Example 1.

| Antifriction material with molybdenum disulphide | | | | Antifriction material with molybdenum disulphide modified with diphenylphosphinic acid | | | |
|---|---|---|---|---|---|---|---|
| Wear at 300° C., g. | | | Coef. of friction | Wear at 300° C., g. | | | Coef. of friction |
| 1st hr | 2nd hr | 3rd hr | | 1st hr | 2nd hr | 3rd hr | |
| 0.1058 | 0.1265 | 0.2045 | 0.15 | 0.0795 | 0.1137 | 0.1026 | 0.13 |

EXAMPLE 16

In this example, the plastic had the following composition, parts by weight: 5 polyphenylquinoxaline of the formula

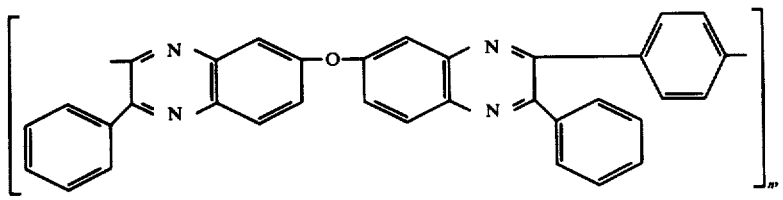

where $n = 200$; 5 molybdenum disulphide of particle size 1 to 2 microns modified with diheptylphosphinic acid and containing 2 percent by weight of phosphorus; and 90 graphite.

The plastic was pressed and the resultant specimens tested in procedures duplicating those of Example 1.

Table XIX

| Antifriction material with molybdenum disulphide | | | | Antifriction material with molybdenum disulphide modified with diheptylphosphinic acid | | | |
|---|---|---|---|---|---|---|---|
| Wear at 300° C., g. | | | Coef. of friction | Wear at 300° C., g. | | | Coef. of friction |
| 1st hr | 2nd hr | 3rd hr | | 1st hr | 2nd hr | 3rd hr | |
| 0.0155 | | 0.0064 | 0.07 | 0.0072 | | 0.0063 | 0.07 |

EXAMPLE 17

In this example, the plastic had the following composition, parts by weight: 15 polyphenylquinoxaline of the formula

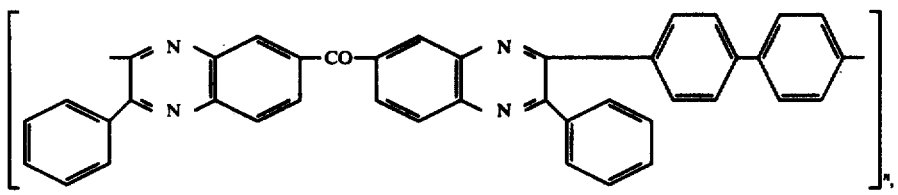

where n = 120; 40 molybdenum disulphide of particle size 1 to 2 microns modified with methylphenylphosphinic acid and containing 0.02 percent by weight of phosphorus; 4 highly dispersed carbon; 40 metallic silver powder; and 1 metallic nickel powder.

The plastic was pressed and the resultant speciments tested in procedures duplicating those of Example 1.

Table XX

| Antifriction material with molybdenum disulphide | | | | Antifriction material with molybdenum disulphide modified with methylphenylphosphinic acid | | | |
|---|---|---|---|---|---|---|---|
| Wear at 300° C., g. | | | Coef. of friction | Wear at 300° C., g. | | | Coef. of friction |
| 1st hr | 2nd hr | 3rd hr | | 1st hr | 2nd hr | 3rd hr | |
| 0.2599 | 0.0987 | 0.1090 | 0.12 | 0.1011 | 0.0870 | 0.1005 | 0.10 |

EXAMPLE 18

In this example, the plastic had the following composition, parts by weight: 5 polyphenylquinoxaline of the formula

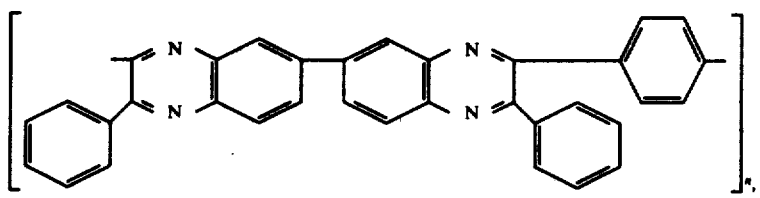

where n = 150; and 95 molybdenum disulphide of particle size 1 to 2 microns modified with triphenylphosphate and containing 0.01 percent by weight of phosphorus.

The plastic was pressed and the resultant specimens tested in procedures duplicating those of Example 1.

Table XXI

| Antifriction material with molybdenum disulphide | | | | Antifriction material with molybdenum disulphide modified with triphenylphosphate | | | |
|---|---|---|---|---|---|---|---|
| Wear at 300° C., g. | | | Coef. of friction | Wear at 300° C., g. | | | Coef. of friction |
| 1st hr | 2nd hr | 3rd hr | | 1st hr | 2nd hr | 3rd hr | |
| 0.0350 | 0.0237 | 0.0174 | 0.10 | 0.0190 | 0.0147 | 0.0167 | 0.09 |

EXAMPLE 19

In this example, the plastic had the following composition, parts by weight: 95 polyphenylquinoxaline of the formula

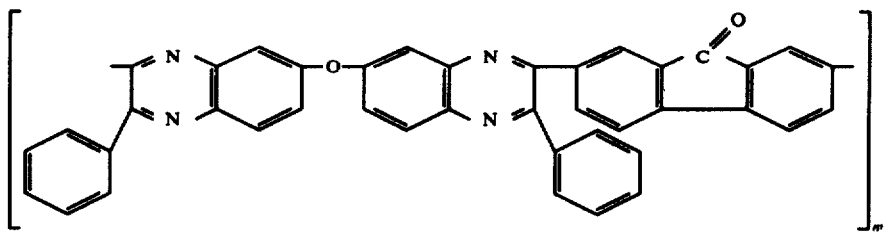

where n = 160; 4 molybdenum disulphide of particle size 1 to 2 microns modified with diphenylphosphinic acid and containing 0.1 percent by weight of phosphorus; and 1 molybdenum disulphide.

The plastic was pressed and the resultant specimens tested in procedures duplicating those of Example 1.

Table XXII

| Antifriction material with molybdenum disulphide | | | | Antifriction material with molybdenum disulphide modified with diphenylphosphinic acid | | | |
|---|---|---|---|---|---|---|---|
| Wear at 300° C., g. | | | Coef. of friction | Wear at 300° C., g. | | | Coef. of friction |
| 1st hr | 2nd hr | 3rd hr | | 1st hr | 2nd hr | 3rd hr | |
| 0.0675 | 0.0709 | 0.0679 | 0.16 | 0.0593 | 0.0615 | 0.0558 | 0.15 |

EXAMPLE 20

In this example, the plastic had the following composition, parts by weight: 5 polyphenylquinoxaline of the formula

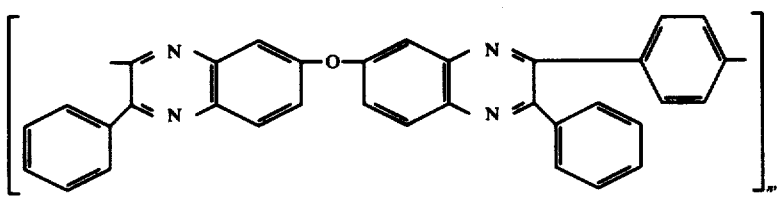

where n = 200; 5 molybdenum disulphide of particle size 1 to 2 microns modified with triphenylphosphate and containing 0.1 percent by weight of phosphorus; and 90 molybdenum disulphide.

The plastic was pressed and the resultant specimens tested in procedures duplicating those of Example 1.

Table XXIII

| Antifriction material with molybdenum disulphide | | | | Antifriction material with molybdenum disulphide modified with triphenylphosphate | | | |
|---|---|---|---|---|---|---|---|
| Wear at 300° C., g. | | | Coef. of friction | Wear at 300° C., g. | | | Coef. of friction |
| 1st hr | 2nd hr | 3rd hr | | 1st hr | 2nd hr | 3rd hr | |
| 0.0320 | 0.0021 | 0.0138 | 0.10 | 0.0220 | 0.0155 | 0.0158 | 0.09 |

EXAMPLE 21

In this example, the plastic had the following composition, parts by weight: 40 polyphenylquinoxaline of the formula where n = 300; 5 molybdenum disulphide of particle size 1 to 2 microns modified with 1,1'-dihydroperfluorobutyldiphenylphosphate and containing 0.07 percent by weight of phosphorus; and 55 graphite.

The plastic was pressed at a temperature of 400° C. and a pressure of from 2,000 to 2,500 kg/sq.cm., and the resultant specimens were tested in a procedure duplicating that of Example 1.

Table XXIV

| Antifriction material with molybdenum disulphide | | | | Antifriction material with molybdenum disulphide modified with 1,1-dihydroperfluorobutylphenylphosphate | | | |
|---|---|---|---|---|---|---|---|
| Wear at 300° C., g. | | | Coef. of friction | Wear at 300° C., g. | | | Coef. of friction |
| 1st hr | 2nd hr | 3rd hr | | 1st hr | 2nd hr | 3rd hr | |
| 0.0012 | 0.0011 | 0.0019 | 0.06 | 0.0010 | 0.0009 | 0.0007 | 0.05 |

EXAMPLE 22

In this example, the plastic had the following composition, parts by weight: 40 polyphenylquinoxaline of the formula

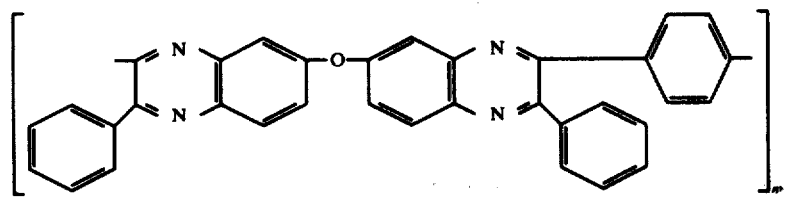

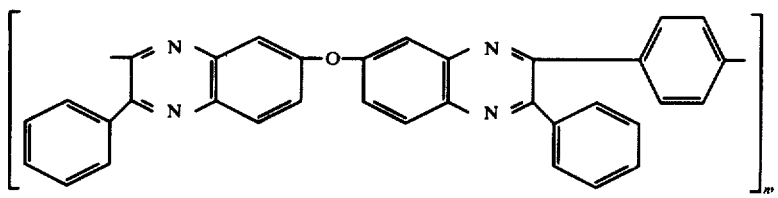

where n = 200; 5 molybdenum disulphide of particle size 1 to 2 microns modified with hexaphenoxycyclotriphosphazene and containing 0.05 percent by weight of phosphorus; and 55 graphite.

The plastic was pressed at a temperature of 400° C. and a pressure of 1,500 kg/sq.cm., and the resultant specimens were tested in a procedure duplicating that of Example 1.

Table XXV

| Antifriction material with molybdenum disulphide | | | | Antifriction material with molybdenum disulphide modified with hexaphenoxycyclotriphosphazene | | | |
|---|---|---|---|---|---|---|---|
| Wear at 300° C., g. | | | Coef. of friction | Wear at 300° C., g. | | | Coef. of friction |
| 1st hr | 2nd hr | 3rd hr | | 1st hr | 2nd hr | 3rd hr | |
| 0.0013 | 0.0012 | 0.0016 | 0.06 | 0.001 | 0.0009 | 0.0009 | 0.05 |

What is claimed is:

1. An antifriction self-lubricating material comprising a press-molded mixture of a nitrogen-containing polymer selected from the group consisting of fusible polyimides of the formula:

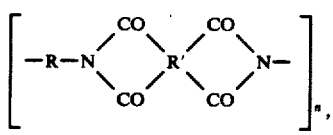

where
R is selected from the group consisting of

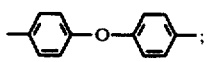

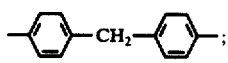

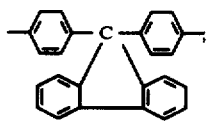

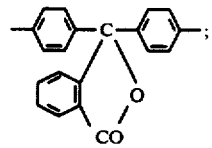

R' is selected from the group consisting of

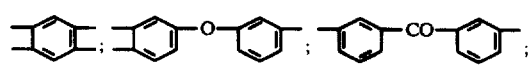

$n =$ from 20 to 400, and polyphenylquinoxalines of the formula

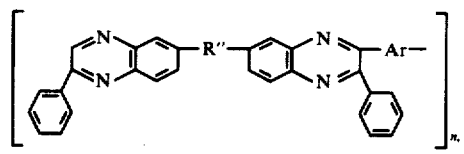

where
R" is selected from the group consisting of —O—; —SO$_2$—, —CO— or is absent;
Ar is selected from the group consisting of

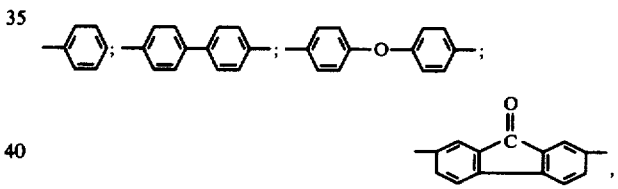

$n = $ from 50 to 300, taken in a quantity of from 5 to 95 percent by weight of the antifriction material, and a filler comprising molybdenum disulphide modified with phosphorus-containing compounds selected from the group consisting of phosphorus-containing acids and phosphorus-containing esters, the phosphorus content in the modified molybdenum disulphide being from 0.01 to 2 percent by weight, and the content of the modified molybdenum disulphide in the antifriction material being within the range from 5 to 95 percent by weight.

2. The antifriction self-lubricating material of claim 1, wherein the filler also comprises molybdenum disulphide to the extent of from 1 to 90 percent by weight of the antifriction material.

3. The antifriction self-lubricating material of claim 1, which comprises molybdenum disulphide modified with phosphorus-containing compounds selected from the group consisting of ortho- and metaphosphoric acids; phosphonic acids of the formula

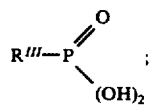

phosphinic acids of the formula $$\begin{array}{c} R^{III} \\ \diagdown \\ R^{IV} \diagup P \diagdown OH \end{array} \diagup O$$

wherein $R^{III}$ and $R^{IV}$ are radicals selected from the group consisting of alkyl, cycloalkyl and aryl radicals containing from $C_1$ to $C_{16}$, $R^{III}$ and $R^{IV}$ being either identical or different; phenyl(1,1-dihydroperfluoralkyl)phosphates of the formula $$(C_6H_5O)_xP(=O)[OCH_2(CF_2)_yCF_3]_{3-x}$$

where $x = 1–3$ and $y = 0–3$; and phenyl(1,1-dihydroperfluoralkoxy) cyclotriphosphazenes of the formula $$(C_6H_5O)_x(-P=N-)_3[OCH_2(CF_2)_yCF_3]_{6-x}$$

where $x = 0–6$ and $y = 0–3$.

4. The antifriction self-lubricating material of claim 1, wherein the content of phosphorus in the modified molybdenum disulphide is from 0.05 to 0.1 percent by weight.

5. The antifriction self-lubricating material of claim 1, wherein the content of the modified molybdenum disulphide is from 10 to 80 percent by weight of the antifriction material.

6. The antifriction self-lubricating material of claim 1, which also comprises a filler which is a powdered metal selected from the group consisting of copper, silver, molybdenum, nickel or a mixture thereof, to the extent of from 1 to 41 percent by weight of the antifriction material.

7. An antifriction self-lubricating material comprising a press-molded mixture of a fusible polyimide of the formula $$\left[ -R-N \begin{array}{c} CO \\ \diagdown \\ CO \end{array} R' \begin{array}{c} CO \\ \diagdown \\ CO \end{array} N- \right]_n$$

where
R is selected from the group consisting of

[phenyl-O-phenyl];

[phenyl-CH$_2$-phenyl];

[phenyl-C(phenyl)(phenyl)-phenyl];

[phenyl-C(phenyl-CO-O)-phenyl];

$R'$ is selected from the group consisting of

[phenylene]; [phenyl-O-phenyl]; [phenyl-CO-phenyl];

$n = 20$ to 400, taken in a quantity of 10 percent by weight of the antifriction material, and a filler comprising molybdenum disulphide modified with phosphorus-containing compounds selected from the group consisting of ortho- and metaphosphoric acids, phosphonic acids of the formula $$R^{III}-P(=O)(OH)_2 \quad ;$$

phosphinic acids of the general formula $$\begin{array}{c} R^{III} \\ \diagdown \\ R^{IV} \diagup P \diagdown OH \end{array} \diagup O$$

where $R^{III}$ and $R^{IV}$ are radicals selected from the group consisting of alkyl, cycloalkyl and aryl radicals containing from $C_1$ to $C_{16}$, $R^{III}$ and $R^{IV}$ being either identical or different; phenyl (1,1-dihydroperfluoralkyl) phosphates of the formula $$(C_6H_5O)_xP(=O)[OCH_2(CF_2)_yCF_3]_{3-x}$$

where $x = 1–3$ and $y = 0–3$; and phenyl (1,1-dihydroperfluoralkoxy) cyclotriphosphazenes of the formula $$C_6H_5O)_x(-P=N-)_3[OCH_2(CF_2)_yCF_3]_{6-x}$$

where $x = 0–6$ and $y = 0–3$, the phosphorus content in the modified molybdenum disulphide being 0.05 percent by weight, and the content of the modified molybdenum disulphide being 80 percent by weight of the antifriction material, and also comprising a metallic molybdenum powder to the extent of 5 percent by weight of the antifriction material as well as highly dispersed carbon to the extent of 5 percent by weight of the antifriction material.

8. An antifriction self-lubricating material comprising a press-molded mixture of a polyphenylquinoxaline of the formula $$\left[ \text{quinoxaline-R''-quinoxaline-Ar-} \right]_n$$

where
R'' is selected from the group consisting of —O—; —SO$_2$—; —CO—; or is absent;
Ar is selected from the group consisting of

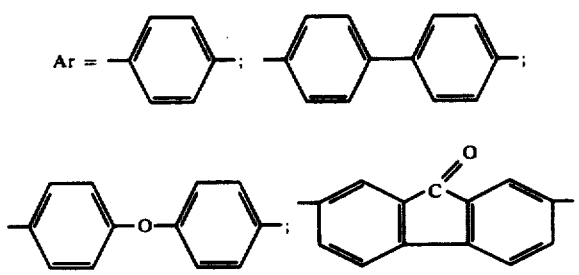

$n$ = from 50 to 300, taken in a quantity of 20 percent by weight of the antifriction material and a filler comprising molybdenum disulphide modified with phosphorus-containing compounds selected from the group consisting of ortho- and metaphosphoric acids, phosphonic acids of the formula

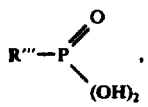

phosphinic acids of the formula

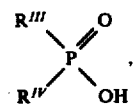

wherein $R^{III}$ and $R^{IV}$ are radicals selected from the group consisting of alkyl, cycloalkyl and aryl radicals containing from $C_1$ to $C_{16}$, $R^{III}$ and $R^{IV}$ being either identical or different; phenyl(1,1-dihydroperfluoralkyl)phosphates of the formula

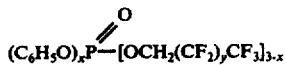

where $x$ = 1–3 and $y$ = 0–3; phenyl (1,1-dihydroperfluoralkoxy) cyclotriphosphazenes of the formula

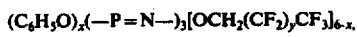

where $x$ = 0–6 and $y$ = 0–3; the level of phosphorus in the modified molybdenum disulphide being 0.1 percent by weight, and the level of the modified molybdenum disulphide being 43 percent by weight of the antifriction material, and also comprising metallic silver powder to the extent of 15 percent by weight of the antifriction material; graphite to the extent of 19 percent by weight; and asbestos to the extent of 30 percent by weight of the antifriction material.

* * * * *